Patented Feb. 21, 1950

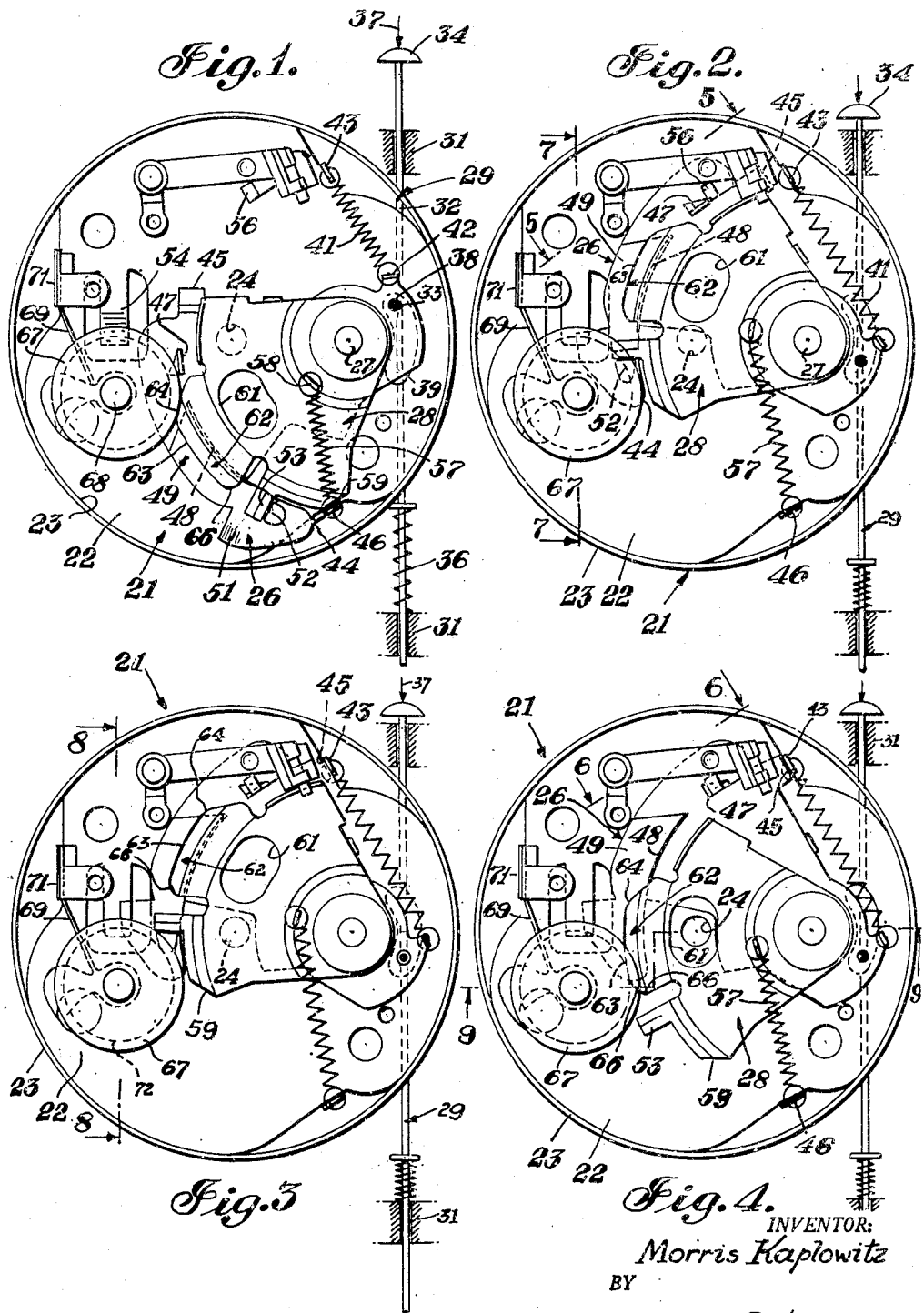

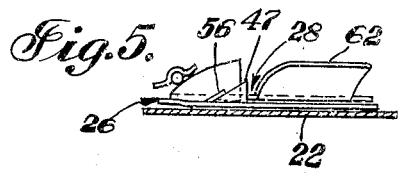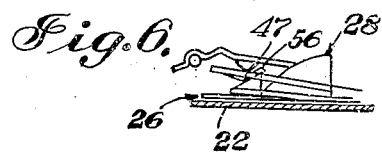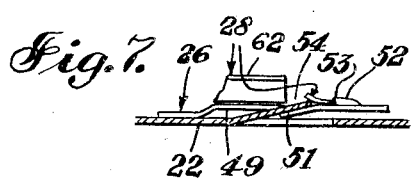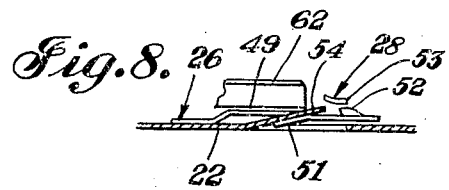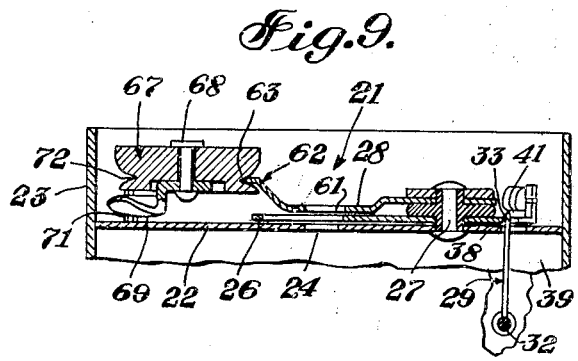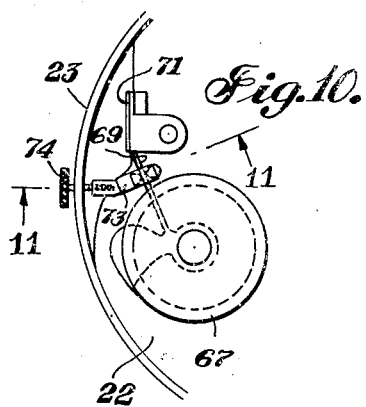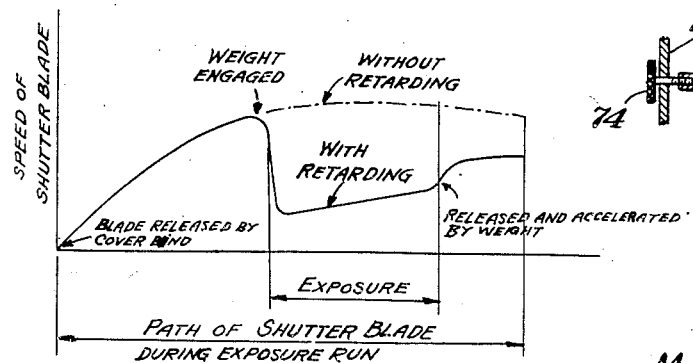

2,498,279

UNITED STATES PATENT OFFICE 2,498,279

PHOTOGRAPHIC SHUTTERS HAVING MOVABLE BLADE AND RETARDING MEANS

Morris Kaplowitz, Brooklyn, N. Y., assignor to Federal Manufacturing & Engineering Corp., a corporation of New York Application September 24, 1947, Serial No. 775,894

6 Claims. (Cl. 95—60)

The invention relates to photography and relates more particularly to shutters for use in connection with photographic cameras.

It is necessary to use simple shutter mechanisms for inexpensive cameras. At the same time, shutters of this type must be accurate in timing, and be reliable, and these features are generally found in shutters presently used.

However, many shutters for inexpensive cameras are working at too high a speed. The reason for this is found in the fact that very strong springs are used in connection with the shutter blade; yet, these springs are made purposely strong so that the shutter speed will be substantially the same regardless of the position in which the camera is held when taking a photograph.

In order to check the great shutter speed, various retarding mechanisms have been designed in the past, but these designs have not always been followed by success. For one, the use of a retarder necessitates a still stronger spring, since it not only has to move the shutter blade, but also to overcome the opposition of the retarder; in setting the shutter, the operator has to overcome the pressure of this strong spring which often brings about shaking of the camera which results in a distorted picture. On the other hand, most of these retarding mechanisms only permit a single speed. Other retarders are designed to be inactivated if desired, but the strong spring causes the shutter blade to move so rapidly through the unobstructed path that an altogether too rapid exposure ensues.

An analysis of shutters made heretofore reveals that most of them utilize retarders throughout the entire exposure run of the shutter blade. This necessitates the use of a very strong spring with all the deficiencies inherent in such a structure previously mentioned.

It is therefore one of the principal objects of the invention to provide a shutter for inexpensive cameras wherein the shutter blade speed is checked substantially only during the instant of exposure.

Another object of the invention is to provide such a shutter with a spring that is at once strong enough to move the shutter blade at any position and also sufficiently weak to permit an unretarded exposure speed that is still practicable.

Another object of the invention is the provision of such a shutter that is dependable and accurate in performance.

Another object of the invention is the provision of retarded shutter speed for such a shutter wherein the exposure follows rapidly the trigger action.

Another object of the invention is to provide such a shutter that opens fast and remains open for a prolonged instant and thereby may make use of fast flash-light bulbs as well as slower responding flash-light bulbs.

Another object of the invention is the provision of a shutter trigger that may be energized for releasing the stored energy at a desired instant.

Another object of the invention is to provide such a shutter with two or more exposure speeds.

Another object of the invention is the provision of such a shutter that admits of setting to a point slightly prior to shutter release for enabling an operator to bring about release by a small additional pressure exerted against the trigger, whereby the danger of shaking the camera is brought to a minimum.

Another object of the invention is to provide for temporary coupling of the moment of inertia of the blade with the moment of inertia of an independent weight, during the instant of exposure.

A further object of the invention is to provide such a shutter wherein the retarding mechanism is selectively adjustable by hand.

A still further object of the invention is the provision of a sprung yielding obstacle in the path of the shutter blade that is temporarily engaged and energized by the shutter blade for retardation of the blade.

With the above and other objects of the invention in view, the invention consists in the novel methods, construction, arrangement and combination of various devices, elements and parts, as set forth in the claims hereof, certain embodiments of the same being illustrated in the accompanying drawings and described in the specification.

In the accompanying drawings,

Fig. 1 is a plan view, on an enlarged scale, of a shutter in accordance with the invention, with the shutter parts shown in rest position;

Fig. 2 is a plan view similar to Fig. 1, but showing the trigger depressed to a point slightly before shutter release;

Fig. 3 is a plan view similar to Fig. 2, but showing the trigger fully depressed with the shutter blade in release position;

Fig. 4 is a view similar to the foregoing views, but showing the trigger fully depressed and the shutter blade in momentary exposure position during the exposure run;

Fig. 5 is a schematic, fragmentary sectional view taken along line 5—5 of Fig. 2;

Fig. 6 is a schematic, fragmentary sectional view taken along line 6—6 of Fig. 4;

Fig. 7 is a schematic, fragmentary sectional view taken along line 7—7 of Fig. 2;

Fig. 8 is a schematic, fragmentary sectional view taken along line 8—8 of Fig. 3;

Fig. 9 is a sectional view taken along line 9—9 of Fig. 4;

Fig. 10 is a fragmentary plan view of a modified shutter mechanism disclosing an adjusting mechanism for the weight carrier;

Fig. 11 is a fragmentary sectional view taken along line 11—11 of Fig. 10; and

Fig. 12 is a graph showing shutter blade speed in relation to the path of the shutter blade during the exposure run.

In carrying the invention into effect in the embodiments which have been selected for illustration in the accompanying drawings and for description in this specification and referring now particularly to Fig. 1, a shutter mechanism is shown, that is generally indicated at 21. The shutter mechanism is mounted on a shutter plate 22 that is secured in and provides a partition for the lens barrel 23 of a photographic camera.

The shutter plate 22 has a central aperture 24 through which light may be admitted to expose a photo sensitive film held in the camera. The shutter mechanism 21 covers said aperture 24 and may be actuated to expose said aperture for an instant of predetermined time length to make an exposure. For simplicity of presentation, neither the camera nor the camera lens have been shown in detail, since the shutter may be applied to any ordinary camera of conventional design.

A cover blind 26 is pivoted to said shutter plate 22 by means of a pivot 27, as best shown in Fig. 9. Adjacent said cover blind 26, a shutter blade 28 is connected pivotally on the same pivot 27. A trigger 29 is mounted in the camera body 31 and comprises a rod 32 that is slidable and rotatable in the body 31, a pin 33 that projects from the rod 32 and engages the cover blind 26, a knob 34 that extends to the exterior of the camera body 31 for manual actuation of the trigger 29, and a coiled spring 36 that normally holds the knob 34 spaced from the exterior surface of the camera body. In order to actuate the shutter, the operator presses the knob 34 in the direction of an arrow 37 against the pressure of the spring 36. After the exposure has been made, the operator releases the knob 34, and the spring 36 returns the trigger 29 and therewith the knob 34 to its initial position. The end of the pin 33 moves in an arcuate path during actuation of the trigger, due to the pivotal mounting of the cover blind 26, and the resting of the end of the pin 33 in a small opening 38 of the cover blind 26. In order to move in such an arcuate path, the trigger rod 32, in addition to being slidable in the body 31, is also turnable therein. The shutter plate 22 is provided with an arcuate slot 39 to permit passage of the pin 33 and its arcuate movement therein.

The cover blind 26 is made of a solid piece of thing material, such as steel or similar metal, or of fibre, or plastic, and is normally held in a rest position (shown in Fig. 1) by means of a tension spring 41 that is interposed between a lug 42 of the cover blind and a lug 43 of the shutter plate 22. In the rest position, an edge 44 of the cover blind abuts against a stud 46 that is mounted on the shutter plate 22. A cam 47 is mounted near the periphery of the cover blind 26 and is located near the opposite side relative to the edge 44 of the cover blind.

The cover blind 26 is shaped like a segment and is located for its major part adjacent said shutter plate 22. A part 49 of the periphery, however, is severed for a portion from the remainder of the cover blind by a slot 48 and is resilient relative to the remainder of said cover blind 26. This resilient part 49 is spaced for a small distance from the shutter plate 22 and is provided with a slanting surface 51 that is inclined in a direction towards said shutter plate 22, and a projection 52 that extends from the part 49 in a direction opposite relative to the shutter plate 22. The cam 47 serves to provide resistance against trigger depression slightly ahead of the instant of shutter release, and the slanting surface 51 and the projection 52 serve for the purpose of shutter blade release and shutter blade setting, respectively, as will be explained presently.

As best shown in Figs. 1 and 7, the projection 52 abuts against an edge 53 of the shutter blade 28 for moving the latter to a setting position. An inclined extension 54 is provided integral with said shutter plate 22 and lies in the path of the slanting surface 51 of the cover blind. Said inclined projection is angularly disposed similar to said slanting surface and serves to engage the latter in sliding relation so as to disengage the projection 52 from the edge 53 of the shutter blade, as the slanting surface 51 causes the portion 49 to be drawn near the shutter plate 22. When the set position has been reached, an edge 45 of the cover blind abuts against the lug 43 of the shutter plate 22, thus terminating the setting movement. Upon such release the shutter blade starts the exposure run, while the cover blind 26 remains in the set position where it clears the aperture 24 (as shown in Fig. 4), due to the continued pressure exerted by the operator on the trigger knob 34.

Slightly before the cover blind and shutter blade, in their tied movement, reach the set or release position, the cam 47 of the cover blind 26 frictionally engages a resilient contact 56 that is disposed in the path of said cam 47. When the cam reaches the contact 56, the operator feels a certain, though weak, resistance against further trigger depression and that indicates to the operator that the shutter blade is about to be released. A slight further pressure exerted on the knob 34 causes the cam 47 to move the contact 56 in a direction from the shutter plate 22 thus permitting the cover blind 26 to proceed with the setting movement, for releasing shortly thereafter the shutter blade 28.

The pin 33 of the trigger 29 is resilient. When the cam 47 reaches the contact 56 and the operator exerts further pressure on the knob 34, the comparably long pin 33 will be bent yieldably under the impact of this pressure before the mentioned resistance between the cam and the contact is overcome. After said resistance has been overcome, the pin 33 will straighten out under its own resiliency, rapidly, thereby imparting the stored bending energy to the shutter for rapidly completing the setting movement. Thus, the shutter may be brought at any desired speed to the point before setting and then the setting movement will be completed at high velocity, whereby this high velocity is made possible by the rapid straightening of the resilient pin 33.

The contact 56 is mounted on the shutter plate 22 and may serve as one contact for a flash-light synchronizing arrangement, for instance, that shown in the co-pending application by the same inventor, Ser. No. 671,366, filed May 21, 1946.

The shutter blade 28 normally is held in a rest position (shown in Fig. 1) by means of a shutter spring 57 that connects a protuberance 58 of the blade with the stationary stud 46. In the rest position, an edge 59 of the shutter blade abuts against the stud 46. The shutter blade is provided with an arcuate slot or perforation 61 that is laterally spaced from the position of said aperture 24, when said shutter blade is in rest position. During the exposure run, however, the arcuate slot 61 and the aperture 24 are brought in registry so that the aperture 24 is uncovered to make an exposure. The arcuate slot 61 extends in the direction of the exposure path for a greater distance than the aperture 24 and thereby, when the two openings 24 and 61 register during the exposure run, there results a prolonged exposure instant due to the prolonged registry between the two openings.

The shutter blade spring 57 is a coiled tension spring that is sufficiently strong to return the shutter blade 28 from the set position to the rest position at all times, regardless of the position in which the camera is held by the operator. When the shutter blade is released and makes an exposure run without obstruction by a retarder, the spring 57 will cause the blade to move first at accelerated speed, and, due to the diminished tension of the spring as the exposure run proceeds, thereafter to complete the exposure path at more or less constant speed. This is shown most clearly in dot-and-dash lines in Fig. 12. In this case the exposure time equals about one hundredth of a second.

In order to increase the exposure period to about one twenty-fifth of a second, a retarding mechanism is provided that is most clearly shown in Figs. 1, 9, 10, and 11. A lip 62 is secured to the shutter blade 28 and projects from the periphery thereof and extends laterally thereon for a portion of its width. Said lip 62 is spaced for a distance from the shutter plate 22 and has an arcuate edge 63 along the contour, which edge is concentric with said arcuate slot 61. Two edges 64 and 66 are disposed at the lateral ends of said lip 62 and are angularly disposed relative to said arcuate edge 63, thereby eliminating sharp lateral corners on said lip 62. Said lip 62 extends peripherally for a distance comparable to the lateral, or peripheral, extension of said arcuate slot 61.

A disk shaped weight 67 is pivoted about its center at 68 to one end of a weight carrier 69 which is mounted with its other end on a projection 71 of said shutter plate 22. Said weight 67 is freely turnable on said pivot 68 and is provided on its periphery with a circular groove 72. Said groove 72 is spaced from said shutter plate 22 for the same distance as said lip 62 of said shutter blade 28.

Said weight carrier 69 is resilient and is normally biased to project yieldingly a portion of the periphery of said weight 67 into the path of said lip 62. Thereby, said lip 62 will engage said groove 72 when the shutter blade passes the weight 67 in either direction. Said weight 67 is so positioned that the center of the arcuate slot 61 will be in register with the aperture 24, when the centerpoint of said edge 63 of said lip 62 engages the weight 67.

The engagement between the lip 62 and the weight 67 occurs at movement in either direction towards setting or towards rest position, of the shutter blade. During the exposure movement of the blade, the engagement results in retardation of the blade and, in detail, is as follows: After the shutter blade 28 has been released by the cover blind 26, the spring 57 will start the blade on its exposure run at accelerated speed. As soon as, or even before the arcuate slot 61 exposes the aperture 24 completely, the angular edge 65 makes contact with the weight 67 and engages the groove 72 thereof. This causes simultaneously a movement of the weight 67 in a direction away from the pivot 27 against the pressure of the resilient carrier 69 and at the same time causes frictional engagement between the arcuate edge 63 and the groove 72 resulting in rotation of the freely turnable weight 67. The friction results from the pressure exerted by the carrier 69 forcing the lip 62 and groove 72 towards one another. By this engagement the moment of inertia of the shutter blade is temporarily coupled frictionally with that of the comparatively heavy weight 67 and thereby the shutter blade is retarded and the instant of exposure is prolonged. As soon as the arcuate slot 61 has reached the position when the aperture 24 is covered by the shutter blade, the angular edge 64 has reached the groove 72. The inclination of said angular edge 64 causes the weight 67 to exert pressure against said shutter blade 28, under the influence of the power of the carrier 69, in a direction towards the rest position. The shutter blade 28 is thus accelerated by the carrier force in addition to the acceleration the blade receives from the spring 57. At the same time, the shutter blade is released from its engagement with the weight 67 and continues its movement unobstructed throughout the remainder of the exposure run.

The schematic presentation of this retarded exposure run shown in Fig. 12 indicates that the shutter blade is first accelerated, then retarded during the actual exposure and thereafter again accelerated to complete rapidly the exposure run. At this point it will be apparent to those skilled in the art that a shutter of this type, which opens fast and closes slowly, may utilize practically any of the flashing equipment now commercially available, for synchronized flashlight photography. The rapid opening permits the use of the fastest bulbs, and the prolonged exposure permits to catch the flash instant of the slower responding bulbs while the shutter is open. All these type bulbs or other flashing equipment may be utilized with the present shutter in connection with synchronizing apparatus without the need for any adjustment by the operator. A synchronizing apparatus for this purpose may, for instance, be of the type of the aforementioned co-pending application.

Since the retardation of the shutter blade takes place only during a fraction of the exposure run, the energy to be imparted by the blade to the weight 67 is only a fraction of the energy that would be required for retardation of the blade over the entire exposure run. This permits the spring 57 to be dimensioned much smaller in this instance than it would be necessary where the retardation is continuous. The strength of the spring 57 may be sufficiently small, therefore, to permit an exposure of about one-hundredth of a second when the blade moves without retardation.

The provision of temporary engagement of the weight 67 offers a further advantage. Since the weight 67 normally obstructs thus the path of the lip 62 in either direction, it prevents accidental double-exposure through "shutter rebound" as the rebounding force of the blade 28 is not strong enough to move the weight 67 against the pressure of the carrier 69.

In the modification shown in Figs. 10 and 11, an adjustment is provided for the location and bias of the weight 67. A bifurcated element 73 is connected to said carrier 69 and is also connected by means of a thread and screw arrangement to a knob 74 that is disposed on the exterior of the lens barrel 23. This knob 74 may be manually actuated selectively to vary the position of said weight 67 with relation to the path of said lip 62. A gradation may be provided on the exterior of said barrel 23 (not shown) to provide exact indications for retardation. By turning the knob 74 completely in one direction, the element 73 will bend the carrier 69 sufficiently to remove the weight 67 entirely from the path of the lip 62, thereby permitting unobstructed, non-retarded exposure movement of the blade 28.

It will be apparent to those skilled in the art that the novel principles of the invention disclosed herein in connection with specific exemplifications thereof will suggest various other modifications and applications of the same.

It is accordingly desired that in construing the breadth of the appended claims they shall not be limited to the specific exemplifications of the invention described herein.

Having thus described the invention, what I claim as new and desire to be secured by Letters Patent is as follows:

1. In a photographic shutter, the combination with a support and a shutter mechanism mounted on said support and including a movable shutter blade and power means for moving said blade to uncover and to cover an exposure aperture to make an exposure, of a retarding mechanism adapted to control the speed of movement of said blade comprising a weight disposed adjacent said shutter mechanism and being substantially freely turnable and also movable in opposite directions, a weight carrier mounted on said support and having a portion for supporting said weight turnably and said portion being movable therewith in said opposite directions, means associated with said blade for engaging during a predetermined portion of the blade movement a surface of said weight to move the weight in one direction, resilient means operable to urge the weight in the opposite direction to generate friction between said weight surface and said engaging means, during interengagement, sufficient to turn said weight, whereby the momentum of inertia thereof will be temporarily coupled to that of said blade.

2. In a photographic shutter, the combination with a support and a shutter mechanism mounted on said support and including a movable shutter blade and power means for moving said blade to uncover and to cover an exposure aperture to make an exposure, of a retarding mechanism adapted to control the speed of movement of said blade comprising a weight disposed adjacent said shutter mechanism and being substantially freely rotatable and also movable in opposite directions, a weight carrier mounted on said support and having a portion for supporting said weight rotatably and said portion being movable therewith in said opposite directions, means associated with said blade for engaging a surface of said weight to move the weight in one direction, resilient means operable to urge the weight in the opposite direction, to generate friction between said weight surface and said engaging means, during interengagement, sufficient to turn said weight, whereby the momentum of inertia will be coupled to that of said blade, said resilient means being adjustable to change the magnitude of said friction and therefore the rate of retardation.

3. In a photographic shutter, the combination with a support and a shutter mechanism mounted on said support and including a movable apertured shutter blade and power means for moving said blade to uncover and to cover an exposure opening to make an exposure, of a retarding mechanism adapted to control the speed of movement of said blade comprising an element associated with said blade and movable therewith in a predetermined path, a carrier mounted on said support, a freely rotatable weight supported by said carrier and disposed adjacent the path of said element and movable in opposite directions at an angle to said path, a spring operable to bias said weight to move in one direction to project into said path for engagement by said element during movement of said blade, said weight adapted to be pressed during engagement by said element into the opposite direction against the spring bias to clear the path for continued movement and at the same time to generate friction for turning said weight for frictionally coupling said weight to said element, and means for adjusting said spring to change the magnitude of pressure exerted between the element and the weight during interengagement for selectively varying the rate of blade retardation.

4. In a photographic shutter, the combination with a support and a shutter mechanism mounted on said support and including a movable shutter blade and power means for moving said blade to uncover and to cover an exposure aperture to make an exposure, of a retarding mechanism adapted to control the speed of movement of said blade comprising a weight disposed adjacent said shutter mechanism and being substantially freely rotatable and also movable in opposite directions, said weight having a momentum of inertia greater than that of said blade, a weight carrier mounted on said support and having a portion for supporting said weight rotatably and said portion being movable therewith in said opposite directions, means associated with said blade for engaging a surface of said weight to move the same in one direction during a period substantially coinciding with the exposure, resilient means operable to urge the weight in the opposite direction to generate, during interengagement, friction between said weight surface and said engaging means sufficient to turn said weight, whereby the momentum of inertia thereof will be coupled temporarily to that of said blade during said period.

5. In a shutter for photographic equipment, the combination with a support having an exposure aperture and a shutter mechanism mounted on said support including a blade movable to and from a set position, power means for returning said blade from the set position to uncover and to cover said exposure aperture during an exposure run, a movable spring tensioned cover blind adapted to move said blade to the set position and to cover said aperture during setting and to release the blade for the exposure run at the set position, and a trigger operable to move said cover blind for setting said blade, of a retarding mechanism for controlling the speed of the blade during a portion of the exposure run comprising, a weight disposed adjacent said shutter mechanism and being movable in opposite directions and substantially freely turnable about an axis and having on its exterior an annular surface concentric with said axis of rotation, a weight carrier mounted on said support and having a portion for supporting said weight and said portion being movable in said opposite directions with said weight and including a pivot for axially rotatably holding said weight, an extension connected to said shutter blade and movable therewith in a predetermined path, a spring operable to bias said carrier portion to move said weight in one direction for projecting a part of said annular surface in the path of said extension, whereby said extension will engage said annular surface throughout a portion of said path of said extension corresponding substantially to the positions of the blade between the uncovering and covering of the exposure opening and press the weight in an opposite direction against said spring bias for frictional interengagement to turn the weight, and means connected to said support and adapted to be yieldably engaged by said cover blind at a point a small distance before the same releases the blade on the setting movement to notify the operator of impending shutter release upon further trigger actuation.

6. In a shutter for photographic equipment, the combination with a support having an exposure aperture and a shutter mechanism mounted on said support including a blade movable to and from a set position, power means for returning said blade from the set position to uncover and to cover said exposure aperture during an exposure run, a movable spring tensioned cover blind adapted to move said blade to the set position and to cover said aperture during setting and to release the blade for the exposure run at the set position, and a trigger operable to move said cover blind for setting said blade, of a retarding mechanism for controlling the speed of the blade during a portion of the exposure run comprising, a weight disposed adjacent said shutter mechanism and being movable in opposite directions and substantially freely turnable about an axis and having on its exterior an annular surface concentric with said axis of rotation, said weight normally independent of said shutter blade and adapted to be interengaged thereto for a portion of the movement thereof, a weight carrier mounted on said support and having a portion for supporting said weight and said portion being movable in said opposite directions with said weight and including a pivot for axially rotatably holding said weight, an extension on said blade having a surface extending in the direction of movement of said blade for a portion corresponding to the uncovering of said aperture, a spring operable to press said carrier portion to move said weight in one direction for projecting a part of said annular surface in the path of said extension surface, whereby the latter will engage said annular surface throughout a portion of said path of said extension and press the weight in an opposite direction against said spring pressure for frictional interengagement to turn the same, said extension having an oblique surface adjacent said first mentioned extension surface for causing said weight to impel the shutter blade under the spring pressure towards completion of the exposure run following termination of the frictional interengagement between said first extension surface and said annular surface.

MORRIS KAPLOWITZ.

REFERENCES CITED

The following references are of record in the file of this patent:

UNITED STATES PATENTS

| Number | Name | Date |
| --- | --- | --- |
| 1,235,273 | Wollensak | July 31, 1917 |
| 2,051,225 | Riddell | Aug. 18, 1936 |
| 2,117,972 | Mihalyi | May 17, 1938 |
| 2,143,776 | Hickman | Jan. 10, 1939 |
| 2,206,811 | Drotning et al. | July 2, 1940 |
| 2,252,688 | Blank | Aug. 19, 1941 |